US010521315B2

(12) United States Patent
Antony et al.

(10) Patent No.: US 10,521,315 B2
(45) Date of Patent: Dec. 31, 2019

(54) HIGH AVAILABILITY HANDLING NETWORK SEGMENTATION IN A CLUSTER

(71) Applicant: VMWARE, INC., Palo Alto, CA (US)

(72) Inventors: Jinto Antony, Bangalore (IN); Hariharan Jeyaraman Ganesan, Bangalore (IN); Madhusudhanan Gangadharan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 77 days.

(21) Appl. No.: 15/222,988

(22) Filed: Jul. 29, 2016

(65) Prior Publication Data

US 2017/0242764 A1    Aug. 24, 2017

(30) Foreign Application Priority Data

Feb. 23, 2016  (IN) .............................. 201641006291

(51) Int. Cl.
| | | |
|---|---|---|
| *G06F 11/00* | (2006.01) | |
| *G06F 11/20* | (2006.01) | |
| *G06F 11/14* | (2006.01) | |
| *G06F 9/455* | (2018.01) | |

(52) U.S. Cl.
CPC ...... *G06F 11/2007* (2013.01); *G06F 9/45558* (2013.01); *G06F 11/1438* (2013.01); *G06F 2009/45595* (2013.01)

(58) Field of Classification Search
CPC combination set(s) only.
See application file for complete search history.

(56) References Cited

U.S. PATENT DOCUMENTS

| | | | |
|---|---|---|---|
| 7,213,246 B1* | 5/2007 | van Rietschote | ... G06F 11/1482 707/999.202 |
| 9,020,895 B1* | 4/2015 | Rajashekar | ....... G06F 17/30088 707/639 |
| 9,183,101 B2* | 11/2015 | Gondi | ................. G06F 11/2033 |
| 9,772,916 B2* | 9/2017 | Rangasamy | ........ G06F 11/2033 |
| 2011/0167298 A1* | 7/2011 | Lee | ..................... G06F 11/1658 714/18 |
| 2017/0289040 A1* | 10/2017 | Sreeramoju | ............. H04L 47/12 |

\* cited by examiner

*Primary Examiner* — Amine Riad

(57) ABSTRACT

A system and method for responding to a virtual machine (VM) network failure for a host in a network partition in a high availability (HA) cluster. The method includes providing a plurality of network partition response options; and receiving a selection of a first network partition response option from the plurality of network partition response options, the selected first network partition response option causing a processor to transfer execution of a VM on the host to a second host that has VM network connectivity upon detecting a VM network failure for the host.

20 Claims, 9 Drawing Sheets

US 10,521,315 B2

HIGH AVAILABILITY HANDLING NETWORK SEGMENTATION IN A CLUSTER

RELATED APPLICATION

Benefit is claimed under 35 U.S.C. 119(a)-(d) to Foreign Application Ser. No. 201641006291 filed in India entitled "HIGH AVAILABILITY HANDLING NETWORK SEGMENTATION IN A CLUSTER", filed on Feb. 23, 2016, by VMware, Inc., which is herein incorporated in its entirety by reference for all purposes.

CROSS-REFERENCE TO RELATED APPLICATIONS

This application incorporates by reference U.S. patent application Ser. No. 13/182,303, "Robust Live Migration Using Shared File System," now issued as U.S. Pat. No. 8,671,238, and U.S. patent application Ser. No. 10/319,217, "Virtual Machine Migration," now issued as U.S. Pat. No. 7,484,208.

BACKGROUND

Virtual machines (VMs), may be executed by a group, or "cluster," of host computing devices ("hosts"). Each VM creates an abstraction of physical computing resources, such as a processor and memory, of the host executing the VM and executes a "guest" operating system, which, in turn, executes one or more software applications. The abstracted resources may be functionally indistinguishable from the underlying physical resources to the guest operating system and software applications. Supporting technology referred to as "live migration" can move running VMs between hosts in Me cluster; and is available as VMware vSphere® vMotion® from VMware Inc. of Palo Alto, Calif. In addition, cluster virtualization management software can determine initial and ongoing locations of VMs on hosts within the cluster and can manage the allocation of cluster computing resources. An example of cluster virtualization management software is referred to as Distributed Resource Scheduler™, a feature of VMware vSphere®, also by VMware, Inc. In addition, high availability (hereinafter referred to as "HA") provides features that monitor VMs to detect guest system and hardware failures, potentially restarting the VMs on other hosts in the cluster without manual intervention when a failure is detected. High Availability is another feature of VMware vSphere™ by VMware, Inc. of Palo Alto, Calif.

HA is a top priority for critical applications in any enterprise or business. However, conventional HA clustering technology has limitations with respect to VM availability. For example, when a management network failure occurs for a subset of the cluster's hosts, these partitioned hosts might be unable to communicate over the management network with the other hosts in the cluster. In addition, one of the hosts in a network partition may lose VM network connectivity, which causes that particular host to become network isolated with all other hosts within a network portioned host. This results in network access for all the VMs running in that particular host getting lost, which further results in permanent access loss for that particular VM to a user or customer until at least the VM network connectivity is manually fixed for the respective host.

SUMMARY

One or more embodiments disclosed herein provide a method for managing VM connectivity for hosts in a partitioned HA cluster. The method includes determining that a first host, having a VM executed thereon, in a HA cluster is in a network partition. Upon detecting a VM network failure for the first host, a network partition response is executed. The network partition response includes transferring the execution of the VM on the first host to a second host that has VM network connectivity.

DETAILED DESCRIPTION

Embodiments of the present disclosure provide a proactive approach to a detection of and reaction to a partitioned host losing virtual machine (VM) network connectivity, which results in the access for all VMs running on the partitioned host getting lost. More specifically, the methods and systems described herein enable a detection of a VM network failure for partitioned hosts and provide a heuristic approach to the automated recovery of the impacted VMs.

In accordance with embodiments of the present disclosure, the term "host" refers to a computing device that executes one or more workloads, such as VMs, an instance of a server application a web server or an application server), and/or an instance of a data processing application (e.g., a distributed computing client). The software application instances may be associated with (e.g., stored in) one or more storage devices (e.g., data stores), such that a software application instance may be migrated to or restarted at any host with access to the data store that corresponds to the software application instance.

Figure 1:
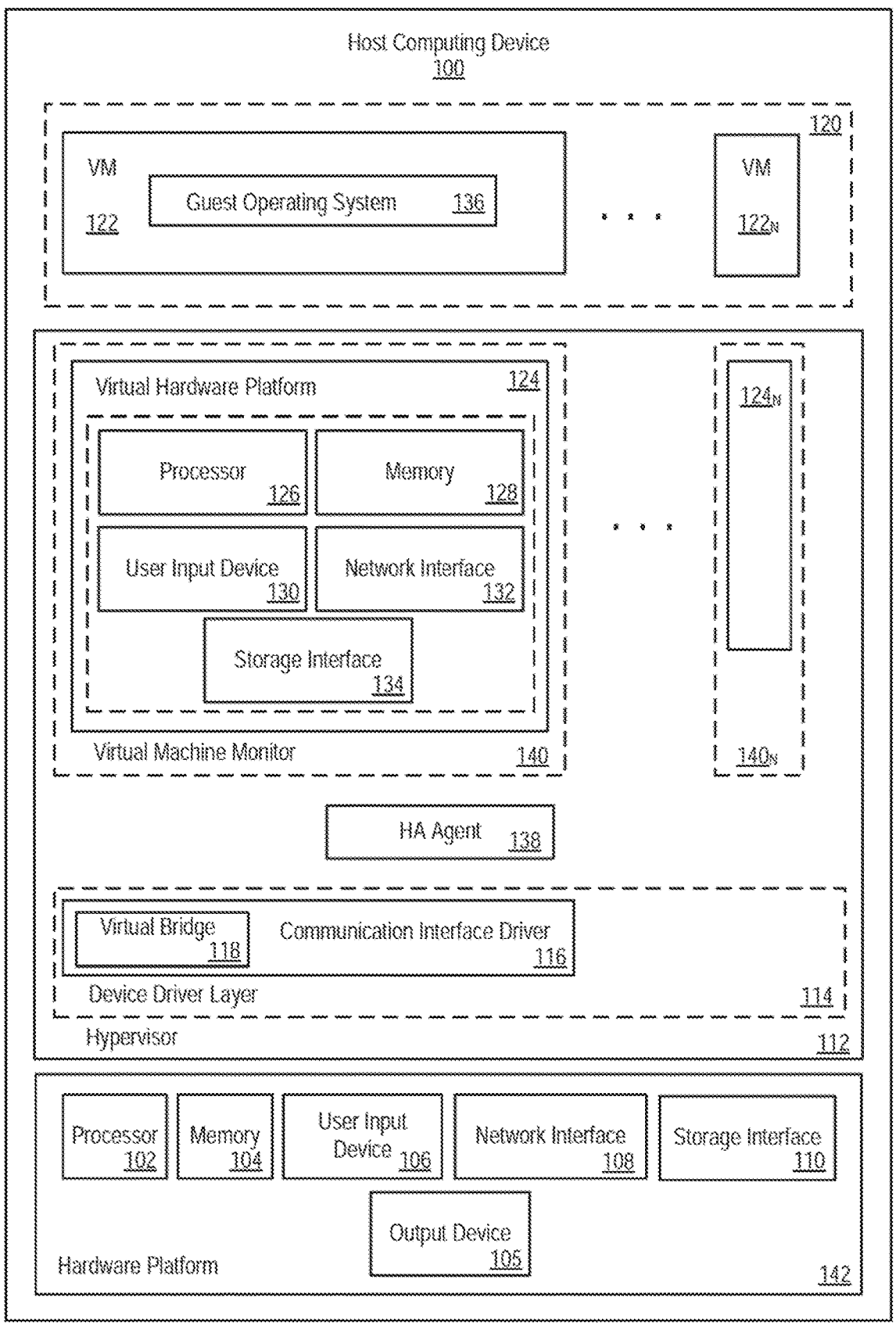
FIG. 1 is a block diagram that illustrates a virtualized computing, according to embodiments of the present disclosure.

With reference now to FIG. 1, a block diagram of an exemplary host computing device 100 (e.g., hosts 206-212 shown in FIG. 2) is provided. Host computing device 100 includes a hardware platform 142, such as an x86 architecture platform. In embodiments, hardware platform 142 includes processor 102, memory 104, network interface 108, storage interface 110, and possibly other input/output (I/O)

devices or interfaces, such user input device 106 or a presentation device not shown) for presenting information to a user. In embodiments, processor 102 is transformed into a special purpose processor by executing computer-executable instructions or by otherwise being programmed. For example, processor 102 is programmed with instructions such as illustrated in FIGS. 3-5 and 8.

Memory 104 may be any device allowing information, such as executable instructions, suitability values, configuration options (e.g., predetermined durations for receiving transmissions), and/or other data, to be stored and retrieved. For example, memory 104 may include one or more random access memory (RAM) modules, flash memory modules, hard disks, solid state disks, and/or optical disks. In some embodiments, executable instructions for performing one or more of the operations described herein, for example, the operations shown in FIGS. 3-5 and 8 are stored in memory 104. In one embodiment, memory 104 includes one or more computer-readable storage media that have computer-executable components embodied thereon.

Figure 2:
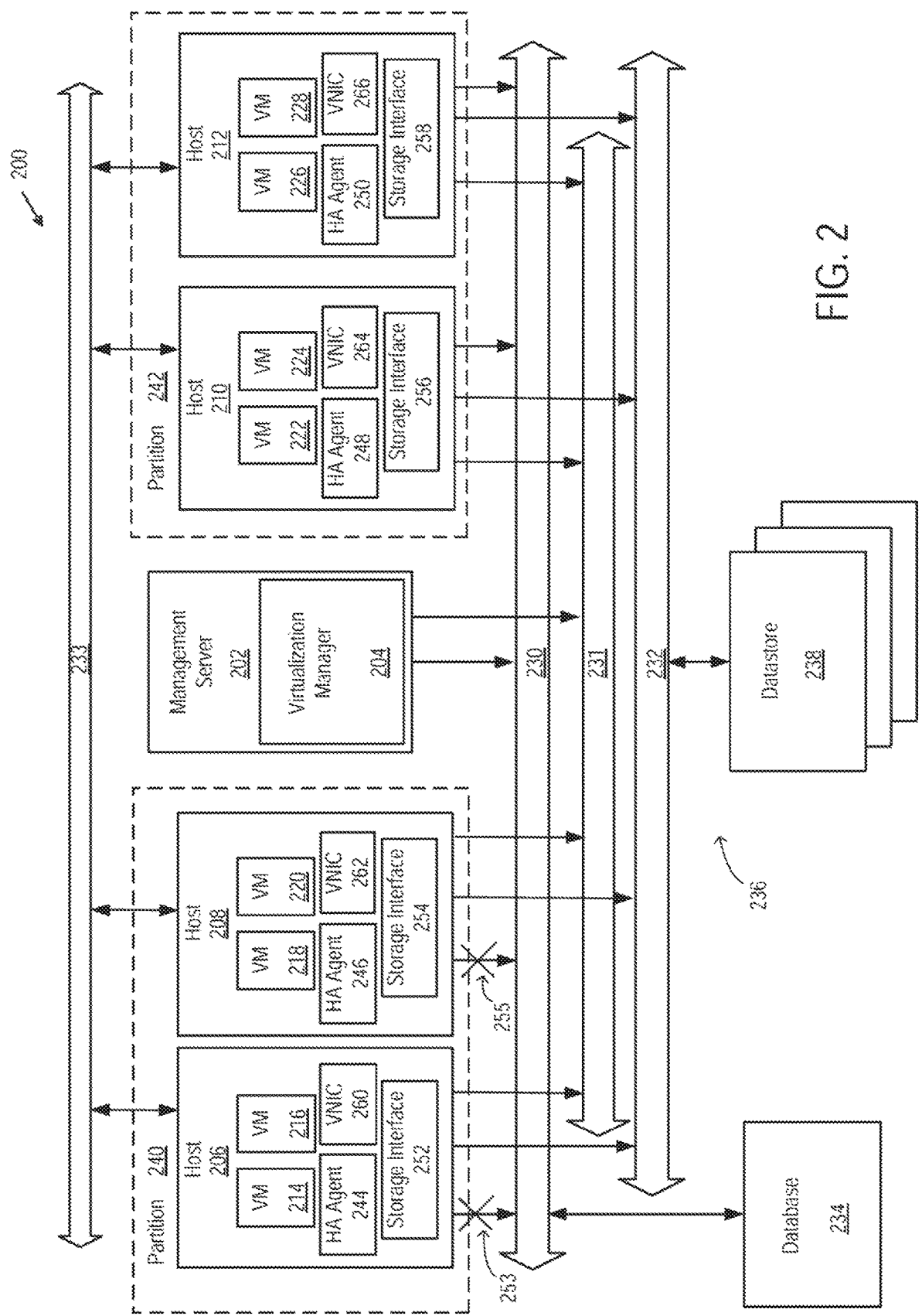
FIG. 2 is a block diagram of a system architecture comprising a cluster of hosts, according to embodiments of the present disclosure.

Network interface 108, which enables host computing device 100 to communicate with a remote device (e.g., another host computing device 100) via a communication medium, such as a wired or wireless packet network (e.g., management network 230 shown in FIG. 2). For example, host computing device 100 may transmit and/or receive messages e.g., heartbeat messages and/or execution commands) via network interface 108. Network interface 108 also enables host computing device 100 to communicate with one or more storage devices (e.g., data store 238 shown in FIG. 2). In exemplary embodiments, network interface 108 couples host computing device 100 to a storage area network (SAN) (e.g., SAN 236 shown in FIG. 2) and/or to a network-attached storage (NAS) system (e.g., via a packet network). An example of network interface 108 is a network adapter, also referred to as a Network Interface Card (NIC). In some embodiments, a plurality of NICs is included in network interface 108. Storage interface 110 enables host computing device 100 to communicate with one or more network data storage systems that may, for example, store virtual disks that are accessed by VMs. Examples of storage interface 100 are a host bus adapter (HBA) that couples host 100 to a SAN (e.g., SAN 236 shown in FIG. 2) or a network file system interface. In some embodiments, the storage interface 110 may be a network-enabled storage interface such as Fibre Channel, and Internet Small Computer system Interface (iSCSI). By way of example, storage interface may be a Fibre Channel host bus adapter (HBA) having a data transfer rate sufficient to transfer a complete execution state of a VM, e.g., 4-Gbps, 8-Gbps, 16-Gbps Fibre Channel HBAs.

As shown in FIG. 1, a virtualization software layer, also referred to hereinafter as a hypervisor 112, is installed on top of hardware platform 142. The virtualization software layer supports a VM execution space 120 within which multiple VMs (VMs 122-122N) may be concurrently instantiated and executed. Hypervisor 112 includes a device driver layer 114 and maps physical resources of hardware platform 142 (e.g., processor 102, memory 104, user input device 106, network interface 108, and/or storage interface 110) to "virtual" resources of each of VMs 122-122$_N$ such that each of VMs 122-122$_N$ has its own virtual hardware platform e.g., a corresponding one of virtual hardware platforms 124-124$_N$), with each virtual hardware platform having its own emulated hardware (such as a processor 126, a memory 128, a user input device 130, a network interface 132, a storage interface 134, and other emulated I/O devices). Virtual hardware platform 124 may function as an equivalent of a standard x86 hardware architecture such that any x86-compatible desktop operating system (e.g., Microsoft Windows® brand operating system or operating system based on the Linux® kernel) may be installed as guest operating system (OS) 136 in order to execute applications for an instantiated VM, such as VM 122.

In some embodiments, memory 128 in virtual hardware platform 124 includes a virtual disk that is associated with or "mapped to" one or more virtual disk images stored in memory 104 (e.g., a hard disk or solid state disk) of host computing device 100. The virtual disk image represents a file system (e.g., a hierarchy of directories and files) used by VM 122 in a single file or in a plurality of files, each of which includes a portion of the file system. In addition, or alternatively, virtual disk images may be stored in memory 104 of one or more remote host computing devices 100, such as in a SAN configuration. In such embodiments, any quantity of virtual disk images may be stored by host computing device 100.

Device driver layer 114 includes, for example, a communication interface driver 116 that interacts with network interface 108 to receive and transmit data from, for example, a local area network (LAN) connected to host computing device 100. Communication interface driver 116 also includes a virtual bridge 118 that simulates the broadcasting of data packets in a physical network received from one communication interface (e.g., network interface 108) to other communication interfaces (e.g., the virtual network interfaces of VMs 122-122$_N$). Each virtual network interface for each of VMs 122-122$_N$, such as network interface 132 for VM 122, may be assigned a unique virtual Media Access Control (MAC) address that enables virtual bridge 118 to simulate the forwarding of incoming data packets from network interface 108.

It should be recognized that the various terms, layers and categorizations used to describe the virtualization components in FIG. 1 may be referred to differently without departing from their functionality or the spirit or scope of the invention. For example, virtual hardware platforms 124-124$_N$ may be considered to be part of VM monitors (VMM) 140-140$_N$, which implement the virtual system support needed to coordinate operations between hypervisor 112 and their respective VMs. Alternatively, virtual hardware platforms 124-124$_N$ may also be considered to be separate from VMMs 140-140$_N$, and VMMs 140-140$_N$ may be considered to be separate from hypervisor 112. Hypervisor 112 that may be an ESX® hypervisor, which is implemented as a commercial product in VMware's vSphere® virtualization product, available from VMware Inc. of Palo Alto, Calif. in another embodiment, hypervisor 120 may include a different hypervisor, such as Hyper-V®, available from Microsoft Corp. of Redmond, Wash., or Xen® available from Citrix Systems, Inc. It should further be recognized that other virtualized computer systems are contemplated, such as hosted VM systems, where the hypervisor is implemented in conjunction with a host operating system.

With reference now to FIG. 2, a block diagram of a system architecture in accordance with one embodiment is provided. As shown in FIG. 2, system 200 includes virtualization manager 204, which is software that executes on a management server 202 running an OS (e.g., Microsoft Windows® brand operating system or an operating system based on the Linux® kernel). In one embodiment, virtualization manager 204 is a computer program that resides and executes in a central server, which may reside in computing system 200, or alternatively, running as a VM in a host in a cluster of hosts (e.g., hosts 206-212). One example of a virtualization manager is the vCenter™ Server product made available from VMware, Virtualization manager 204 is configured to carry out administrative tasks for computing system 200, including managing hosts 206-212, managing VMs 214-228 running within hosts 206-212, provisioning VMs (e.g., VMs 214-228), migrating VMs 214-228 from one of hosts 206-212 to another one of hosts 206-212, and load balancing between hosts 206-212.

In one or more embodiments, virtualization manager 204 may organize hosts (e.g., hosts 206-212) into one or more clusters that aggregate and manage the combined resources of hosts 206-212 as a single collection. Virtualization manager 204 may be configured to provide high-availability (HA) functionality that provides automatic failover for any VMs executing within the cluster of hosts 206-212. For example, upon detecting a host has failed, virtualization manager 204 may automatically migrate or restart any affected VMs that were on the failed host onto a different host within the cluster. In the embodiment shown in FIG. 2, virtualization manager 204 monitors all hosts 206-212 in the cluster using an agent, e.g., HA agents 244, 246, 248, and 250, executing on hosts 206, 208, 210, and 212, respectively.

In other embodiments, one of hosts 206-212 in the cluster may be designated as a master or primary host and be given the responsibilities of monitoring the state of other hosts (e.g., slave hosts or secondary hosts) within the cluster, and orchestrating restarts and failovers of VMs within the cluster. In exemplary embodiments, a limit domain manager (FDM) (e.g., HA agents 244, 246, 248, and 250) includes software application that has executable instructions for selecting a master host. The FDM application also includes instructions for acting as a master host and for acting as a secondary. As such, the methods described herein may be executed by any one of hosts 206-212, with each host 206-212 being capable of selecting a master host, acting as the master host, and acting as a secondary host, as appropriate.

As shown in FIG. 2, management server 202 is connected to hosts 206-212 via a management network 230, from which hosts 206-212 may communicate with one another. In one embodiment, management network 230 may be a LAN (local area network), a WAN (wide area network), the Internet, or the like.

Hosts 206-212 may also communicate with one another via SAN 236, which also provides data storage, such as a storage array (e.g., a disk array) and a switch 232 that connects a data store (e.g., data store 238) within the storage array to hosts 206-212 via respective storage interfaces 252-258. Switch 232 may be a SAN fabric switch, but other types of switches may be used. SAN 236 is accessible by hosts 206-212 (e.g., via respective storage faces 252-258), and as such, may be designated as a "shared storage" for hosts 206-212, in the embodiment shown in FIG. 2, the storage array includes a data store 238 configured for storing VM files and other data that facilitates techniques for VM migration described in further detail below. In addition, distributed storage systems other than SAN, such as network attached storage may be used.

Hosts 206-212 execute one or more software application instances, such as VMs 214-228, which are associated with virtual disk images, configuration files, and/or other, data stored in file systems provided by data store 238. Data store 238 is, for example, a logical container for files (e.g., partition on a disk or storage volume with logical unit number (LUN) which, in one embodiment, can be formatted with VMware®'s Virtual Machine File System (VMFS) file system). Data store 238 can be local, e.g., a server's hard drive, or remote, e.g., a storage device attached to a storage area network (SAN), such as SAN 236.

In some embodiments, hosts 206-212 might be "partitioned" in groups in light of a network (e.g., management network 230) failure between two or more of hosts 206-212. For example, as depicted by crossed links 253 and 255, hosts 206 and 208 have lost network connectivity to management network 230, thus creating partition 240 and partition 242. However, embodiments described herein enable a partitioned secondary host to manage (e.g., monitor and/or restart) VMs hosted thereon and/or enable a partitioned master host to manage VMs hosted by itself or other partitioned secondary hosts.

For example, when two or more of hosts 206-212 (e.g., hosts 206 and 208) lose connectivity to management network 230, these partitioned hosts are unable to communicate with other hosts (e.g., hosts 210 and 212) in system 200 via management network 230 or with virtualization manager 204 via management network 230. However, a loss of connectivity to management network 230 does not necessarily mean that hosts 206 and 208 have failed. As described in further detail below, "heart beating" enables a host (e.g., a master host) or virtualization manager 204 to more correctly determine a state of a host that is not reachable via management network 230. More specifically, to ensure hosts 206 and 208 have not failed and have merely lost connectivity to management network 230, heart beating (e.g., through shared storage) can be used to make a distinction between a failed host and a partitioned host and/or a partitioned host that has also lost connectivity to VM network 231 (e.g. as depicted by crossed links 253 shown in FIG. 6). In the example shown in FIG. 2, hosts 206 and 208 have lost connectivity to management network 230 and each of HA agents 244 and 246 are configured to maintain a "heartbeat" with virtualization manager 204, and in some embodiments, with other HA agents on other hosts (e.g., an HA agent on a master host), via VM network 231.

For example, a virtual NIC, such as virtual NICs 260-266, are configured with a valid IPs. Therefore, when a network partition (e.g., partition 240 and partition 242) occurs within a cluster, these IP's are pinged frequently from virtualization manager 204. If any of the IPs are not pingable, it is determined that that connectivity to VM network 231 is down for one or more hosts in that particular partition. To validate the loss of the VM network connection, one of the partitioned hosts (e.g., host 206 or host 208) pings the IP of one or more other hosts (e.g., host 210 or host 212) in the cluster. If the second validation ping is also a failure, the loss of VM connectivity is confirmed for the partitioned host. In response to the loss of the VM network connectivity for the partitioned host, a course of action (e.g., a network partition response) is executed for the partitioned host to enable VMs on the partitioned host, including management actions thereof, to be available to a user.

Figure 9:
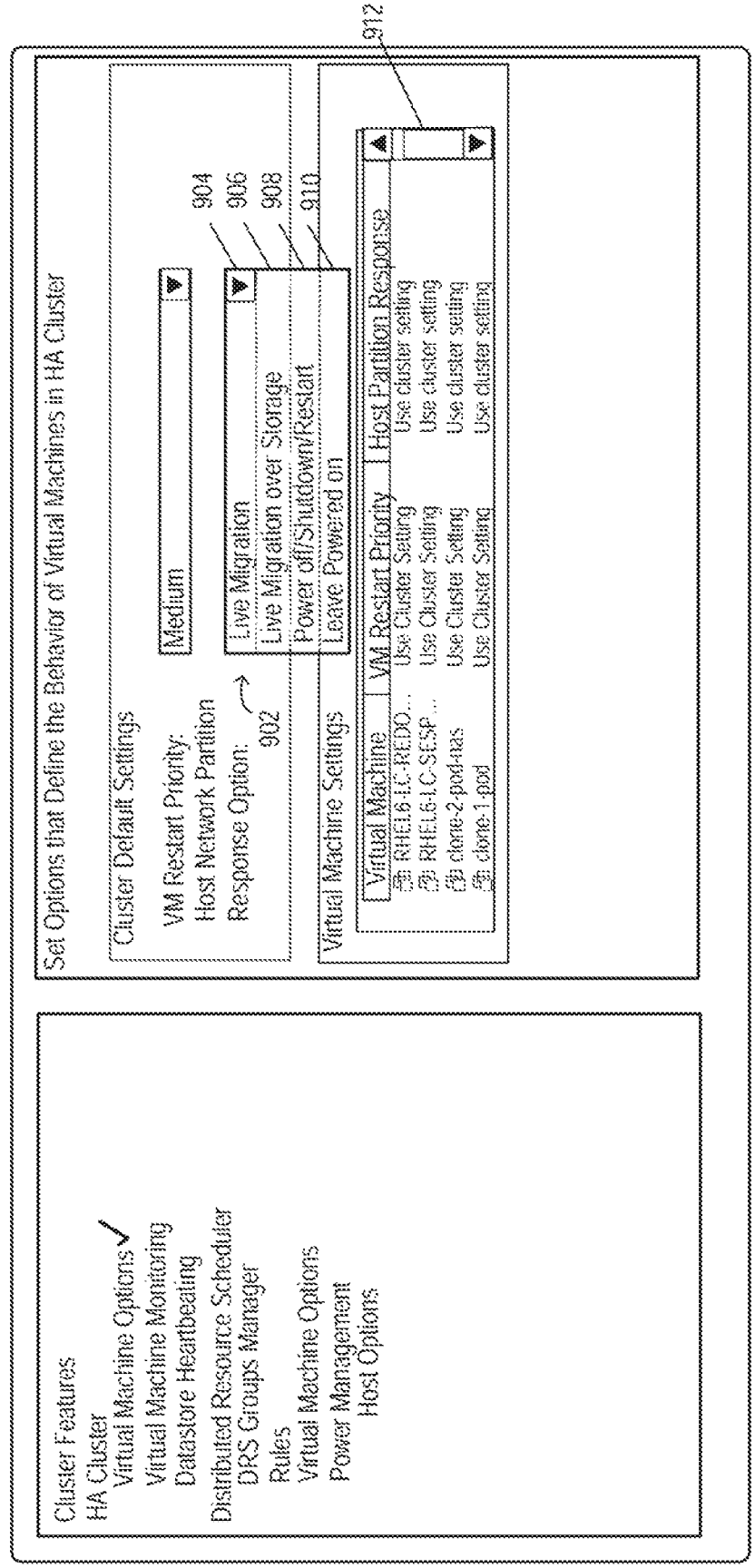
FIG. 9 illustrates a user interface for selecting a network partition response, according to another embodiment of the present disclosure.

In one or more embodiments, virtualization manager 204 may be configured to associate (e.g., via user input) a particular network partition response for VMs 214-228 that determines the course of action that should be performed in response to partitioned hosts losing connectivity to VM network 231. The network partition response may be configured (e.g., by user input) for all VMs (e.g., VMs 214-228) executing in the entire cluster of hosts 206-212, for all VMs executing on a particular host, and/or for individual VMs. For example, as shown in FIG. 9, a user interface 900 provides a dropdown menu 902 that enables a user to select a network partition response option from a plurality of network partition response options. As described in further detail below, the plurality of network partition response options include a live migration option 904, a live migration over storage option 906, and shutdown/restart option 908, and a leave power on option 910. In addition, user interface 902 includes a list of virtual machines within virtual machine settings 912 that enables a user to identify which virtual machines to associate the particular network partition response option and restart priority selected by the user.

As mentioned above with respect to FIG. 9, the network partition response may include a power off option, in which VM(s) on the partitioned hosts are powered off in a "hard stop" manner, and a Shut-down option, in which VM(s) on the partitioned hosts perform a guest-initiated shutdown procedure.

When a VM is powered off or shutdown in case of a network partition, the shared storage lock in datastore 238 is released, which allows the VM to be started up in another host in the cluster that has network connectivity. In some embodiments, the network partition response may include a Leave-Powered-On option, in which VM(s) on the partitioned hosts remain powered on and continue running even though the hosts can no longer communicate with other hosts (i.e., no response, and the state of the VM(s) is unchanged.) However, in such embodiments, if the VMs remain powered on during network partition, the VMs may not be accessible for any user because the hosts are isolated. Further, if the VMs on the partitioned hosts are powered off or shut down (and corresponding VMs are launched on other hosts in the cluster), the execution state of the VMs after network partition has occurred may be lost. The execution state of a VM refers the state of guest operating system 136 (as shown in FIG. 1) and any applications running in the VM, which may be represented by data stored in virtual hardware platform 124, including the individual states of virtual devices.

Thus, embodiments of the present disclosure provide network partition responses that transfer the execution of a VM to another host while maintaining the execution state of a VM after a partitioned host loses VM network connectivity.

Figure 3:
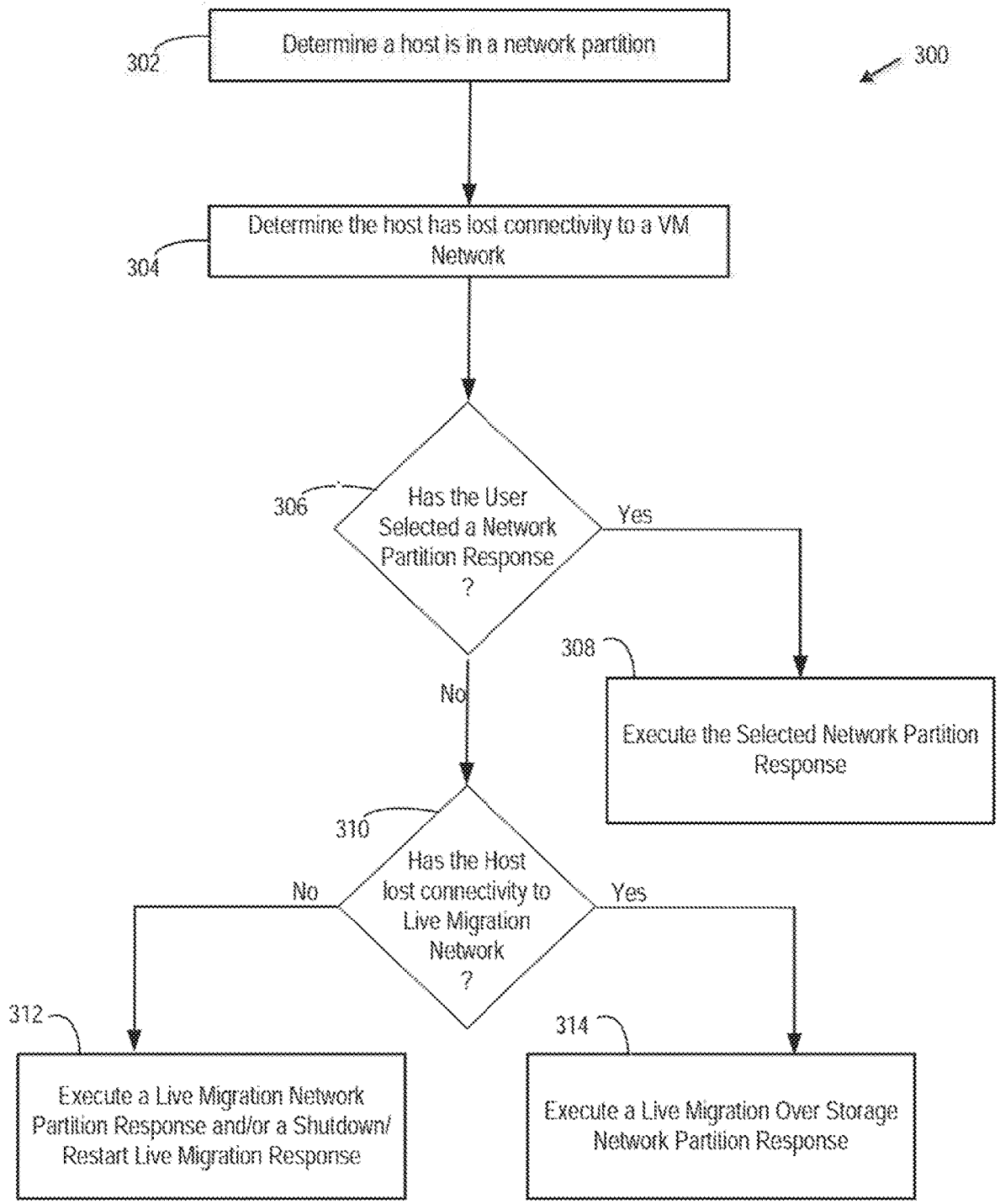
FIG. 3 is a flow diagram that illustrates a method for executing a network partition response, according to embodiments of the present disclosure.

With reference now to FIG. 3 and FIG. 2, an exemplary flow chart of a process 300 for executing a network partition response is provided. While process 300 will be described concurrently with FIG. 2, it should be recognized that any system configured to perform the method steps is contemplated.

Process 300 begins at 302 where t is determined that a host (e.g., hosts 206 and 208) are a network partition as a result of a network failure (e.g. a loss of connectivity with management network 230). Network partitioning is a problem known to those in the field, and various mechanisms for detecting network partitioning are likewise known. Thus, the mechanism described herein for detecting network partitioning should not be considered limiting as the overall solution is not necessarily tied to a specific embodiment for network partition detection. In one or more embodiments, components external to hosts 206 and 208 may determine that host 206 and 208 are in a network partition and act accordingly to shutdown/restart/migrate VMs executing on hosts 206 and 208. Upon determining that a network partition exists, at 304, it is also determined that host 206 has lost connectivity to VM network (e.g., VM network 231 in FIG. For example, virtual NIC 260 is configured with a valid IP that is pinged from virtualization manager 204 to verify connectivity to VM network 231. Thus, once the IP of virtual NIC 260 is not pingable, virtualization manager 204 determines that that host 206 has lost connectivity to YM network 231 (as depicted by crossed links 253). Further, the determination may be based on detecting the loss of heartbeat messages from host 206 beyond a threshold period of time. Otherwise, virtualization manager 204 may continue to monitor hosts 206-212. In another embodiment, to validate and/or determine the loss of connectivity to VM network 231, host 206 (and more specifically, HA agent 244 pings the IP provided for, for example, VM network 231 of other hosts (e.g., host 210 or host 212) in the cluster. If HA agent 244 determines that the for VM network 231 of the other hosts are not pingable, the loss of connectivity of VM network 231 for host 206 is confirmed/determined.

Responsive to determining host 206 has lost connectivity to management network 230 and VM network 231, virtualization manager 204 may select one or more other hosts (e.g., hosts 210 and 212) in the cluster as destination hosts for migrating VMs 214 and 216. Virtualization manager 204 may select a destination host (e.g., hosts 210 or 212) for each of VMs 214 and 216 according to known techniques for load balancing and further based on finding which of hosts 210 and 212 have compatible hardware requirements. One example technique for load balancing and VM placement is provided by VMware Distributed Resource Scheduler (DRS) as made available by VMware, Inc, of Palo Alto, Calif.

At 306, it is determined whether a user has selected, via user interface 900 and drop down box 902 shown in FIG. 9, a network partition response. The network partition response may be selected for all VMs executing in an entire cluster of hosts, for all VMs executing on a particular host, and/or for individual VMs. If it is determined that the user has selected a network partition response, at 308, the selected network partition response is expected. Embodiments described herein enable the network partition response for a particular VM to include: a) a live migration network portioned response (e.g., live migration 904 as shown in FIG. 9), whereby a network partitioned host will be placed into self-maintenance mode once VM network connectivity is lost. Using a live migration network (e.g., live migration network 233) that is still active between a network partitioned host (e.g., 206) and other hosts within the cluster, live migrating VMs on the network partitioned host to other hosts within the cluster that have VM network connectivity; b) a live migration of VMs over storage network portioned response (e.g., live migration over Storage 906 as shown in FIG. 9), whereby a partitioned host that has lost VM network connectivity or all network connectivity, a live migration of a VM on the partitioned host is performed using a shared storage system to transfer the execution state of the VM to a host within the cluster that has VM network connectivity; c) a power off/shutdown/restart of the VMs on a healthy host network portioned response (e.g., Power off/Shutdown/Restart 908 in FIG. 9), whereby once a network partitioned host (e.g., host 206) loses VM network connectivity, the VMs in the network partitioned host are powered off/shutdown and restarted in other hosts within the cluster that have VM network connectivity; d) a leaving of the VMs in the same state network partitioned response (e.g., Leave Powered on 910 in FIG. 9), whereby the VMs on a partitioned host that has lost VM network connectivity are left in the network partitioned host and are not accessible by a user.

At 310, if the user has not selected a network partition response, in response to the loss of connectivity to VM network 231, HA agent 244 determines a network partition response to execute for host 206 to enable VMs 214 and 216 to be available to a user despite the user losing access to VMs 214 and 216 on host 206 by transferring the execution of VMs 214 and 216 to a healthy host (e.g., host 210 or 212) that has connectivity to VM network 231

Live Migration

Figure 4:
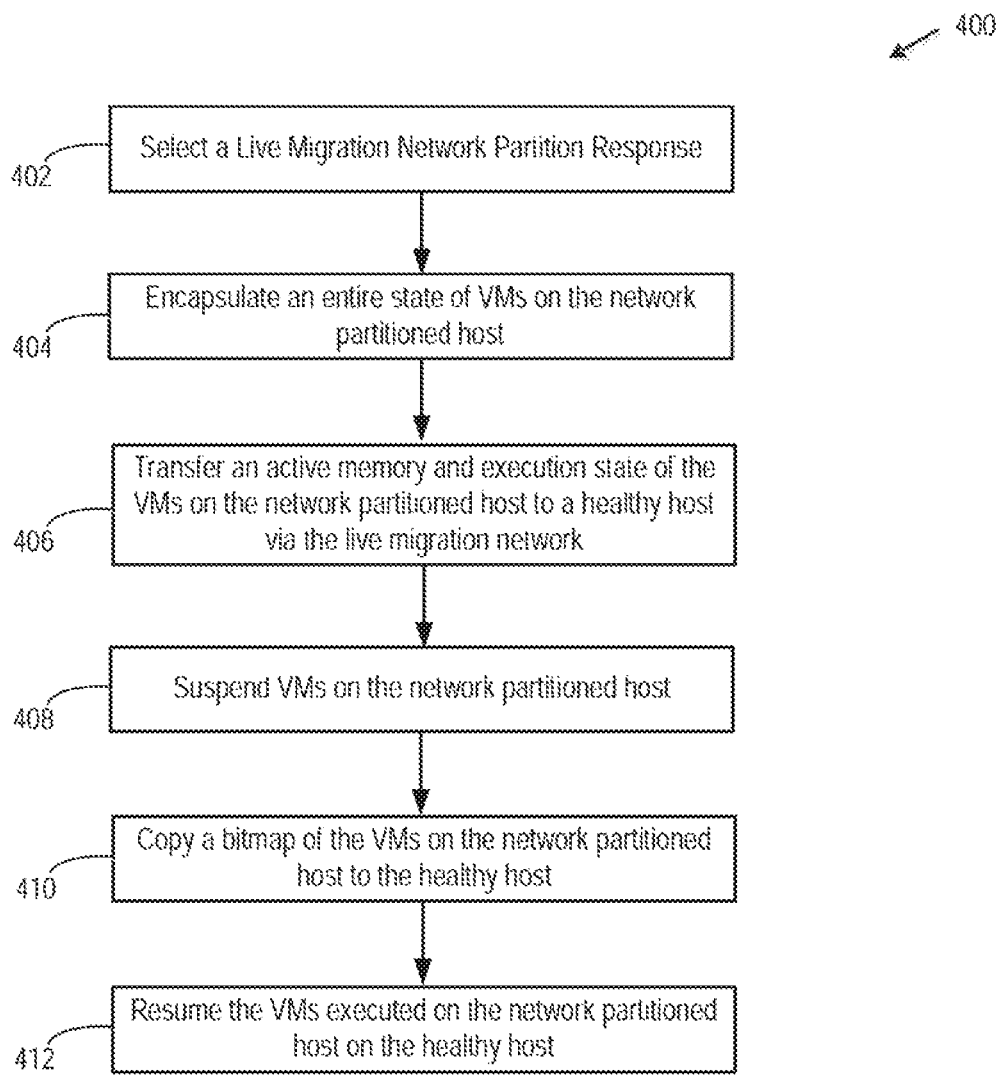
FIG. 4 is a flow diagram that illustrates a method for executing a live migration network partition response, according to embodiments of the present disclosure.

With reference now to FIG. 4 and FIG. 2, an exemplary flow Chart of a process 400 for executing a network partition response that performs a live migration of VMs to a healthy host is provided. While process 400 will be described concurrently with FIG. 2, it should be recognized that any system configured to perform the method steps is within the scope of embodiments of the present disclosure.

Process 400 begins at 402 where, upon determining that the user has selected the live migration network partition response at 306 or alternatively, based on a determination that host 206 has connectivity to live migration network 233 (e.g., at step 312 in FIG. 3), HA 244 determines/selects the network partition response to be executed is a live migration of VMs 214 and 216 to a healthy second host (e.g., hosts 210 and 212) that has connectivity to VM network 231. While the following description to FIG. 4 describes VM 214 being migrated to host 210, VM 216 is also migrated to one of hosts 210 or 212 in a manner similar to the migration of VW 214. Further, both of VMs 214 and 216 may be migrated to host 210 or host 212, or alternatively, VM 214 may be migrated to host 210 while VM 216 is migrated to host 212, or vice versa.

With reference back to FIG. 4, at 404, an entire state of VM 214 is encapsulated by a set of files stored in shared storage (e.g., SAN 238). At 406, an active memory and execution state of VM 214 is transferred to a healthy host (e.g., host 210) via the live migration network 231, enabling VM 214 to switch/migrate from host 206 to host 210. Further, by virtualization manager 204 keeping track of on-going memory transactions of VM 214 in a bitmap, once an entire memory and system state of VM 214 has been copied over to host 210, at 408, virtualization manager 204 suspends VM 214. In one embodiment, prior to suspending VM 214, a quiesceing set of state information associated with VM 214 is obtained by executing a backup application program that quiesces VM 214. The quiesceing set of state information, or quiesced state, is then copied and saved and can be utilized to reconstruct an original state of VM 214 in the event of a system crash. Frequently, the quiesced state used for backup includes primarily data stored in a persistent storage device (e.g. a disk drive). Also, additional data (e.g., caches and application-specific dump functions) may be obtained from a volatile memory.

At 410, virtualization manager 204 copies the bitmap of VM 214 to host 210, and at 412, virtualization manager 204 resumes VM 214 on host 210. In addition, networks being used by VM 214 are also virtualized by host 210, ensuring that even after the migration of VM 214, VM network identity and network connections of VM 214 are preserved. Thus, since the migration of VM 214 preserves the precise execution state, the network identity, and the active network connections, the result is zero downtime and no disruption to users.

Live Migration Over Storage

Figure 5:
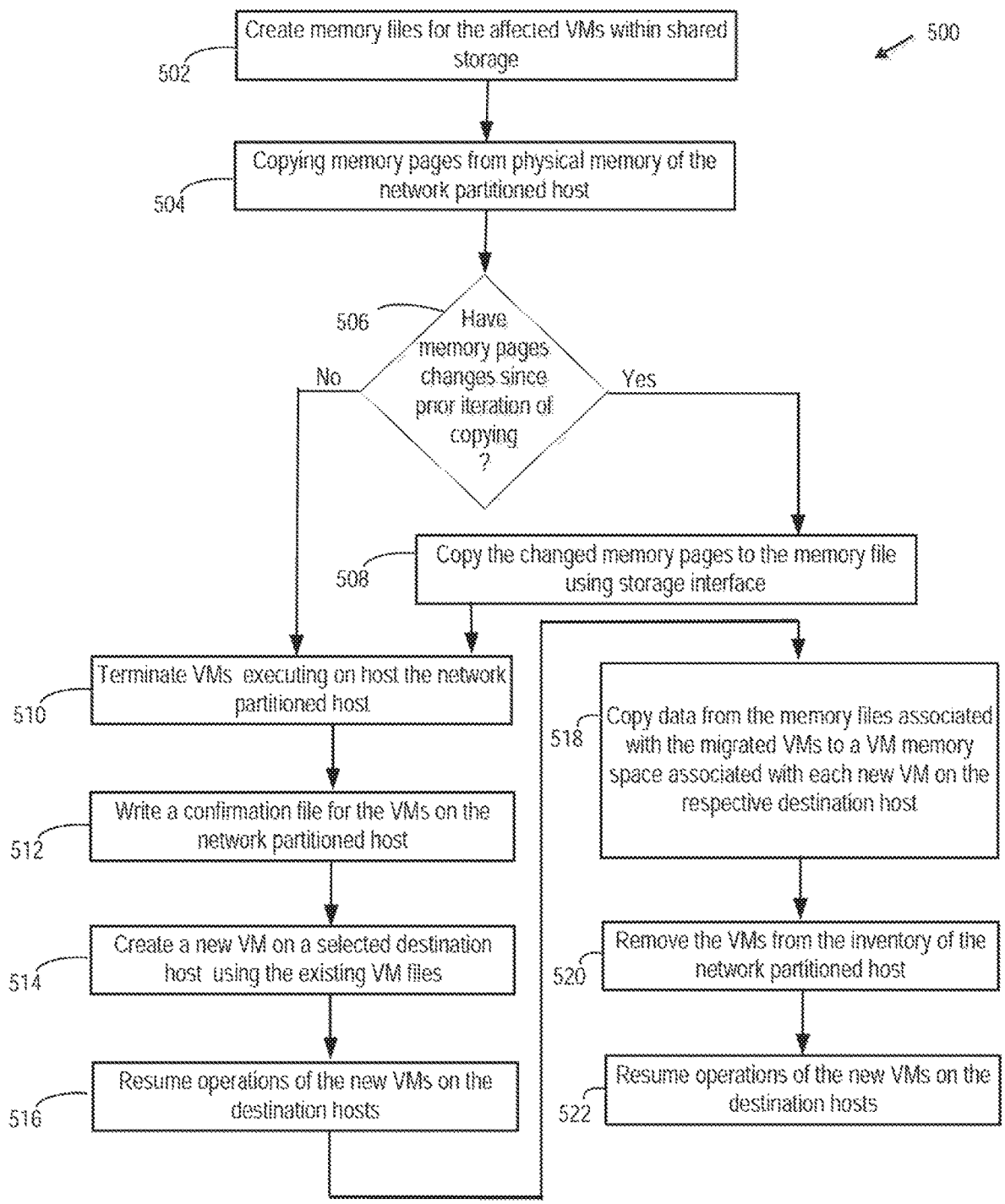
FIG. 5 is a flow diagram that illustrates a method for executing a live migration over storage network partition response, according to another embodiment of the present disclosure.
Figure 6:
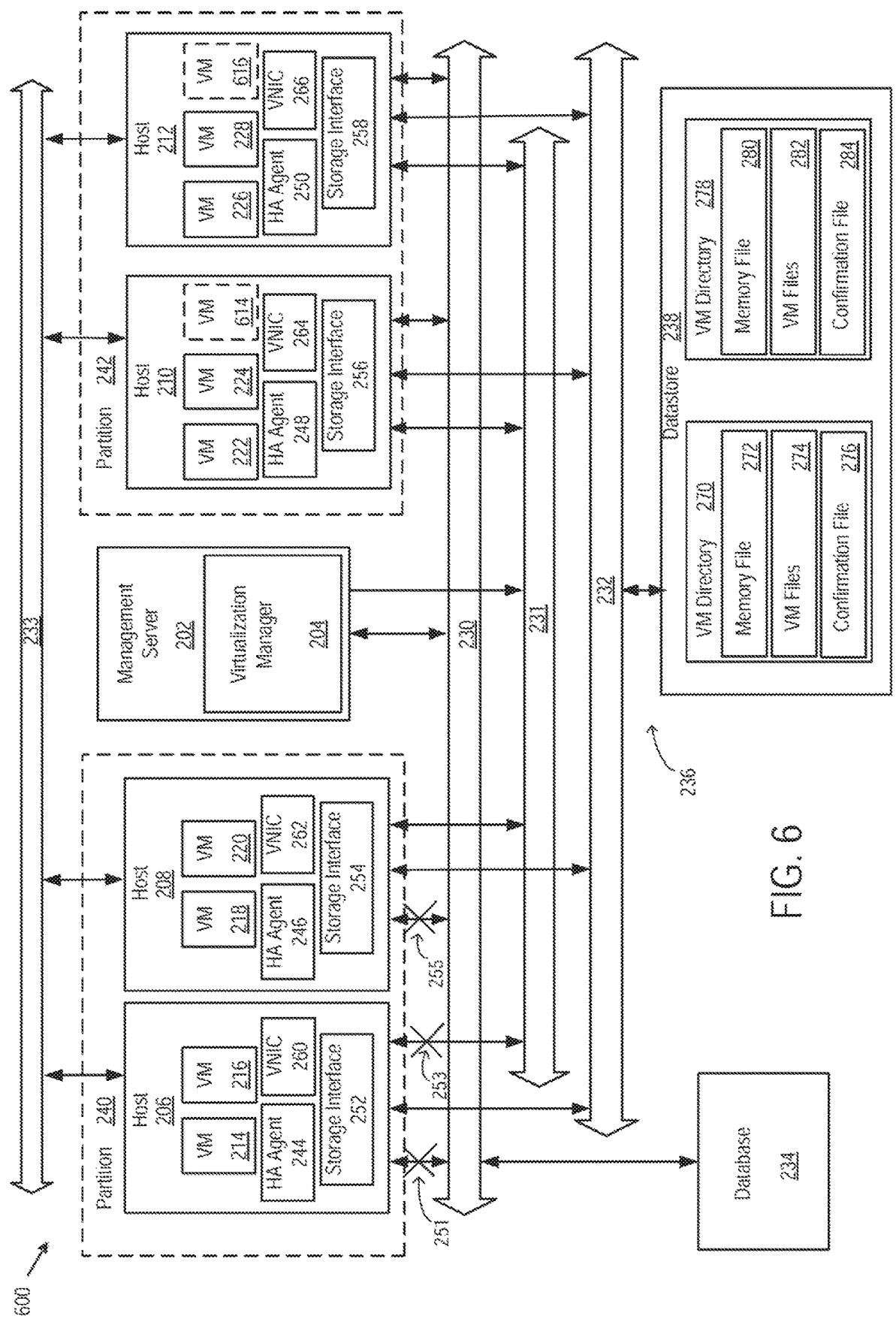
FIG. 6 is a block diagram depicting a system for executing a live migration network partition response, according to one embodiment of the present disclosure.
Figure 7:
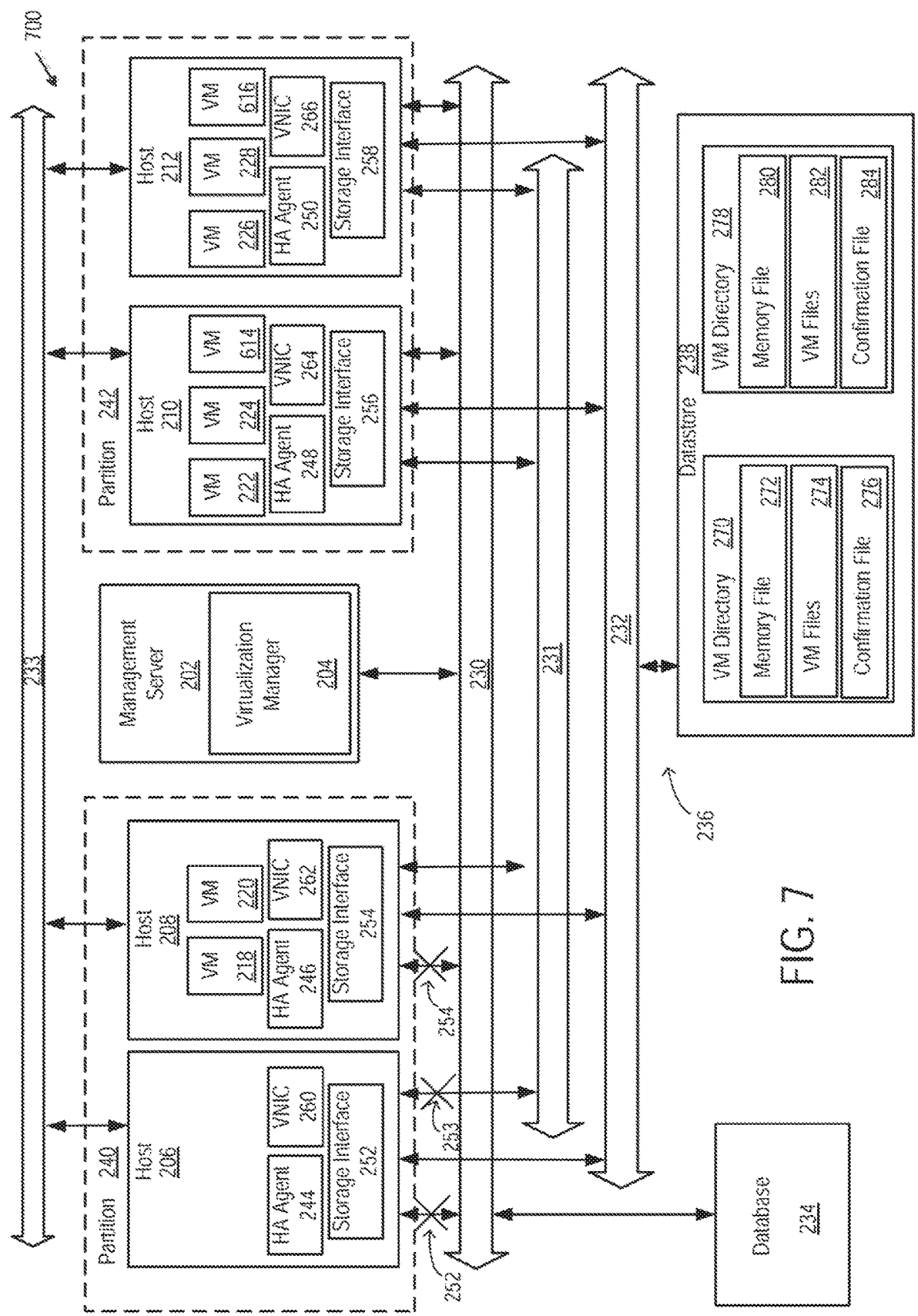
FIG. 7 is a block diagram depicting a system for executing a live migration over storage network partition response, according to another embodiment of the present disclosure.

With reference now to FIGS. 5, 6, and 7, an exemplary flow chart of a process 500 for executing a network partition response that performs a live migration of VMs over storage to a healthy host is provided. While process 600 will be described concurrently with FIG. 6, it should be recognized that any system configured to perform the method steps is within the scope of embodiments of the present disclosure.

Process 500 begins at 502 where, upon determining that the network partition response to be executed is a live migration over storage (e.g., via user selection at step 306 in FIG. 3 or at step 314 in FIG. 3) of VM 214 and VM 216 to a healthy second host (e.g., host 210 or host 212) that has connectivity to VM network 231, HA 244 creates memory files within shared storage (e.g., data store 238 of SAN 236) that is accessible by host 210 and host 212 and locks the memory files. In one embodiment, a quiesce operation may be employed to preserve consistency in the file system of the operating system guest of VM 214.

The contents of the memory file for VM 214 represents the entire execution state of VM memory for VM 214 and the content of the memory file for VM 216 represents the entire execution state of VM memory for VM 216. The memory files for VM 214 and 216 may be created within a location in data store 238 associated with VMs 214 and 216, such as a VM directory. In one embodiment, HA agent 244 creates a memory file 272 associated with VM 214 within VM directory 270 and a memory file 280 associated with VM 216 within VM directory 278. VM directories 270 and 278 may contain other files and data associated with the execution and state of VMs 214 and 216, including one or more virtual disk files (e.g., VMDK files) that store the contents of source VM's virtual hard disk drive, VM-related configuration tiles (e.g., ".vmx" files), a paging file (e.g., ".vmem" files) which backs up source VM's memory on the host file system (i.e., in cases of memory over commitment), and log files of the VM's activity, and are depicted by VM files 274 and 282, respectively.

At step 504, HA agent 244 begins copying memory pages from physical memory of host 206 representing guest physical memory of VM 214 and VM 216 to memory file 272 and memory file 280, respectively. In one embodiment, HA agent 244 copies memory pages to data store 238 using a storage interfaces (e.g., storage interface 252 and 254), without copying any of the memory pages through a network interface to network 230, as network connectivity is unavailable. More specifically, HA agent 244 may copy a plurality of memory pages associated with a memory of VM 214 to VM memory file 272 using storage interface 252 and copy a plurality of memory pages associated with a memory of VM 216 to VM memory file 280 using storage interface 254.

In one or more embodiments, HA agent 244 may iteratively copy memory pages to the corresponding memory file in shared storage white VMs 214 and 216 continue to run during the copying of VM memory. A hypervisor on host 206 may be configured to track changes to guest memory pages, for example, through traces placed on the guest memory pages. In some embodiments, at 504, HA agent 244 may copy all of the memory pages into memory file 272 and 280 as an initial copy. As such, in contrast to the paging file for VMs 214 and 216 (e.g., ".vmem" file), which may only contain a partial set of memory pages of guest memory during times of memory over commitment, VM memory files 272 and 280 contain the entire memory state of VM 214 and 216, respectively. At 506, HA agent 244 determines whether any memory pages associated with a particular VM have been changed since a prior iteration of copying of memory pages was made to memory files 272 and 280 in data store 238. If so, at 508 HA agent 244 copies the changed memory pages to memory files 272 and/or 280, The hypervisor on host 206 may repeatedly identify and copy changed memory pages to memory files 272 and/or 280 in an iterative process until no other changed memory pages are found, or alternatively, until some threshold level of completeness is achieved. For example, changed memory pages may be iteratively copied until a threshold percentage (e.g., 99%) of memory pages has been copied, or, in another example, if the amount of changed memory pages or rate of changed memory pages falls below a threshold value.

At 510, responsive to determining that the copy process to memory files 272 and 280 is complete, HA agent 244 kills/terminates VMs 214 and 216 executing on host 206 and releases the lock on memory files 272 and 280 within shared storage. In one embodiment, prior to killing/terminating VM 214 and 216, a quiesceing set of state information associated with VMs 214 and 216 is obtained by executing a backup application program that quiesces VMs 214 and 216. The quiesceing set of state information, or quiesced state, is then copied and saved and can be utilized to reconstruct an original state of VMs 214 and 216. In some embodiments, killing VMs 214 and 216 causes any locks on VM files 274 and 282 previously held by VMs 214 and 216 to be released. In alternative embodiments, rather than kill VMs 214 and 216 executing on host 206, HA agent 244 may "power off" VMs 214 and 216, or gracefully shut down VMs 214 and 216 by instructing the guest operating system running on VMs 214 and 216 to shut down.

At 512, HA agent 244 writes a confirmation file for VMs 214 and 216. The confirmation file provides an indication (e.g., to other hosts in the cluster, such as host 210 and 212) that VMs 214 and 216 are ready to be migrated and resumed in another host in the cluster. In the embodiment shown in FIG. 6, HA agent 244 writes a confirmation file 276 for VM 214 and a confirmation file 284 for VM 216. While embodiments provided herein describe individual confirmation files for VMs 214 and 216, other implementations for providing an indication that a network partitioned VM is ready to be migrated to another host may be used. For example, a single centralized confirmation file may be used that contains entries for each VM prepared to be migrated to another host.

In one embodiment, virtualization manager 204 may instruct one of hosts 210 and 212 that have access to SAN 236 to check for an indication that VMs 214 and 216 are ready to be migrated, e.g., via confirmation file 274. In the embodiment shown in FIG. 6, virtualization manager 204 directs (e.g., via signaling over management network 230) HA agent 248 and HA agent 250 executing on destination hosts 210 and 212, respectively, to check VM directories (e.g., VM directory 270 for VM 214 and VM directory 278 for VM 216) for confirmation files associated with each of VMs 214 and 216, indicating that VMs 214 and 216 are ready to be migrated. In an alternative embodiment, virtualization manager 204 may be configured to have direct access to SAN 238 and may check data store 238 itself according embodiments of the present disclosure.

HA agents (e.g., HA agents 248 and 250) executing on destination hosts (e.g., hosts 210 and 212) may repeatedly check the VM directory associated with VMs to be migrated (e.g., VMs 214 and 216) for a confirmation file. HA agents (e.g., HA agents 248 and 250) executing on the selected destination hosts may determine whether a confirmation file exists within the shared storage system (e.g., SAN 236). If so, HA agents executing on the selected destination hosts return a response to virtualization manager 204 indicating the VMs are ready to be migrated.

At 514, virtualization manager 204 creates a new VM (VM 300) on a selected destination host (e.g., host 210) using the existing VM files (e.g., VM files 274) stored in shared storage (e.g., data store 238). For example, virtualization manager 204 instantiates new VMs (e.g., VMs 614 and 616) on selected destination hosts (e.g., hosts 210 and 212) based on VM files 272 and 280, which may include VM-related configuration files, the virtual disk files, and VM memory paging files associated with VMs 214 and 216. In some embodiments, as new VMs 614 and 616 may be instantiated based on the same VM-related configuration files as VMs 214 and 216, new VMs 614 and 616 may have the same configurations and settings as VMs 214 and 216, such as resource allocation settings (e.g., 4 GB of vRAM, two dual-core vCPUs), and network settings (e.g., IP address, subnet mask).

At step 516, HA agents (e.g., HA agents 248 and 250) executing on the selected destination hosts (e.g., hosts 210 and 212) resume operations of the new instantiated VMs (e.g., new VMs 614 and 616) on the destination hosts. At step 518, the HA agents (e.g., HA agents 248 and 250) copy data from the memory files associated with the migrated VMs (e.g., new VMs 614 and 616) to a VM memory space associated with each migrated/new VM on the respective destination host, using a storage interface (e.g., storage interfaces 256 and 258). In some embodiments, data from the memory files may be copied using a resume-during-page-in (RDPI) or stun-during-page-send (SDPS) techniques that enable resumption of a VM (e.g., VMs 614 and 616) even though data VM memory has not yet been fully copied. Using this technique, VMs 614 and 616 resume operations and copy any data to the host physical memory space from the respective memory files based on page faults. In one embodiment, after copying all data from the memory file has been completed, the respective HA agents on the destination hosts may delete the memory files from data store 238.

At step 520, virtualization manager 204 removes the VM 214 and 216 from the inventory of host 206. In some cases, while virtualization manager 204 may remove entries corresponding to VMs 214 and 216 from its end, host 206 may still have VMs 214 and 216 registered within an internal inventory. If network connectivity were to be later restored to host 206, the internal inventory would contain stale entries for VMs 214 and 216. In one embodiment, virtualization manager 204 notifies HA agent 244 (e.g., via SAN 236) to remove VMs 214 and 216 from the inventory of host 206. In some embodiments, virtualization manager 204 communicates an indication that VMs (e.g., VMs 214 and 216) may be removed from the internal inventory of the network partitioned host (e.g., host 206). In some embodiments, virtualization manager 204 may instruct non-network partitioned hosts (e.g., hosts 210 and 212) that have access to the shared storage to write the indication on its behalf or in other embodiments, virtualization manager 204 may have direct access to shared storage and may write the indication directly. In some embodiments, the indication written to shared storage may be some value added to the respective confirmation files that signals to the HA agent (e.g., HA agent 244) that VMs 214 and 216 may be removed. In other embodiments, the indication written to shared storage may be a separate file within VM directories (e.g., "remove-vm.txt") that indicates a VM may be removed from the internal inventory of the network partitioned host, HA agent 244 detects the indication in shared storage (e.g., change in confirmation files, or new remove-vm.txt file) and removes VMs 214 and 216 responsive to the detected indication.

As shown in FIG. 7, at this point, all VMs (e.g., VMs 214 and 216) executing on host 206 and having an associated network partition response of live migration over storage, have been migrated (shown in FIG. 7 as VMs 614 and VM 616) to another host (e.g., hosts 210 and 212, respectively). Accordingly, the execution state of the guest operating system and state of the applications for VMs 214 and 216 are maintained even after the network partition has occurred.

Thus, embodiments described herein provide live migration over storage without requiring additional hardware, such as additional high-speed NICs or switches for a separate duplicate network dedicated for live migration.

Restart the VMs

Figure 8:
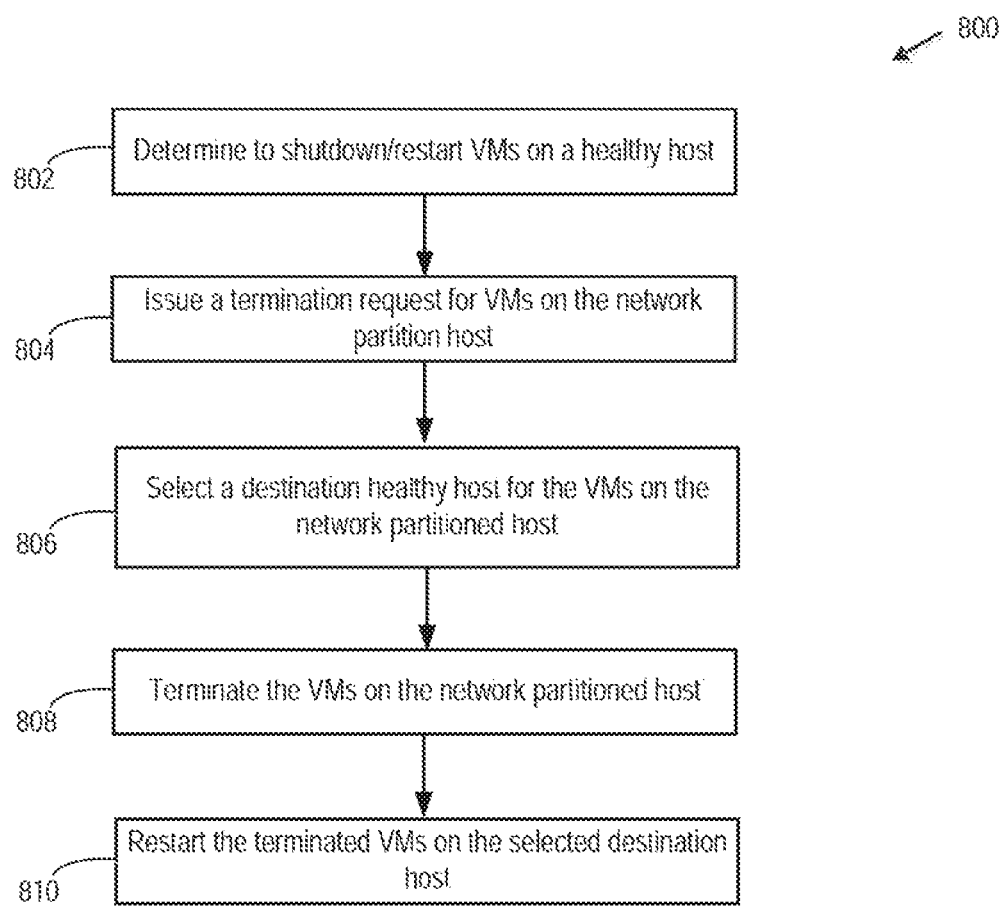
FIG. 8 is a flow diagram that illustrates a method for executing a shutdown/restart network partition response, according to another embodiment of the present disclosure.

With reference now to FIG. 8 and FIG. 2, an exemplary flow chart of a process 800 for executing a network partition response that restarts VMs on a healthy host. While process 800 will be described concurrently with FIG. 2, it should be recognized that any system configured to perform the method steps is within the scope of embodiments of the present disclosure.

Process 800 begins at 802 where, upon determining that the user has selected the power off/shutdown/restart network partition response or alternatively, it is determined that host 206 has lost connectivity to VM network 231, it is determined that the network partition response to be executed is restarting VMs (e.g., VMs 214 and 216) on a healthy host within the cluster. As a result of the determination, at 804, HA 244 issues a termination request for VMs 214 and 216. However, is some embodiments, prior to the termination of VMs 214 and 216, virtualization manager 204 generates a hypothetical placement recommendation for VMs 214 and 216. In some embodiments, prior to assigning VMs 214 and 216 to a destination host, virtualization manager 204 takes into account one or more of the following: determining user preferences, determining which hosts have compatible physical computing resources, determining which hosts have connectivity to data Store 238, and determining which hosts have sufficient available resources. At 806, virtualization manager 204 selects a destination host (e.g., hosts 210 and/or 212) from among the plurality of hosts. At 808, VMs 214 and 216 are terminated, and at 810, the terminated VMs are restarted on the selected destination host. In one embodiment, prior to terminating VMs 214 and 216, a quiesceing set of state information associated with VMs 214 and 216 is obtained by executing a backup application program that quiesces VMs 214 and 216. The quiesceing set of state information, or quiesced state, is then copied and saved and can be utilized to reconstruct an original state of VMs 214 and 216.

In some embodiments, there are a couple of choices as to where decisions are made by an HA agent of the network partitioned host, an HA agent of a master host, and/or virtualization manager 204. For example, a master host or virtualization manager 204 may serve a slave host's request for terminating VMs, selecting a destination host for VMs about to be terminated, reserving resources for VMs about to be terminated (to guarantee to some degree a subsequent successful restart), and restarting the terminated VMs on a healthy host. All the other logic may be executed on the slave host (e.g., host 206).

While embodiments of the present disclosure have described the network partitioned responses separately, it should be noted different network partition responses may be used for any or all of the VMs on a network partitioned host. For example, according to the HA-related configurations set for VMs within the cluster, a first VM on a network partitioned host may be configured to perform a live migration to another host, while a second VM on the isolated host might be configured to perform a shutdown and restart, as described herein.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for responding to a network partition in a high availability (HA) cluster in a virtualized computing system, the HA cluster comprising a management server and a set of hosts over which a set of virtual machines run, the virtualized computing environment comprising a management network via which the management server is connected to the hosts, a migration network via which a VM is migrated from one of the hosts to another of the hosts, and a VM network, wherein the management network, the migration network and the VM network are three different networks, the method comprising:

detecting the network partition in the high availability (HA) cluster, wherein detecting comprises identifying that a first set of hosts fails to contact a second set of hosts over the management network, the first set of hosts being in a first network partition and the second set of hosts being in a second network partition;
    upon detecting the network partition, determining that a first host is in the first network partition and that the first host has lost connectivity to the VM network;
    providing a plurality of network partition response options for the high availability (HA) cluster, the plurality of network partition response options comprising all of the following: live migration, live migration over storage, shutdown/restart, and leave power on, wherein the live migration over storage option is performed using a shared storage to transfer the execution state of the VM from the first host to a second host;
    receiving a selection of a first network partition response option from the plurality of network partition response options; and
    transferring execution of a VM on the first host in the first network partition in the high availability (HA) cluster to the second host in the second network partition in the high availability (HA) cluster that has VM network connectivity.

2. The method of claim 1, wherein the selected first network partition response option further comprises:
    encapsulate an entire state of the VM using a set of files stored on the shared storage between the first host and the second host;
    transfer a memory and execution state of the VM to the second host while the VM is in a powered-on state;
    virtualize networks used by the VM on the first host;
    power off or shutting down the VM on the first host; and
    resume execution of the VM on the second host.

3. The method of claim 1, wherein the selected first network partition response option further comprises:
    power off or shut down the VM on the first host; and
    restart the VM on the second host.

4. The method of claim 1, wherein the selected first network partition response option further comprises:
    copy a memory of the VM to a memory file associated with the shared storage between the first and the second host while the VM is in a powered-on state;
    instantiate a second VM on the second host, the second VM being based on data associated with the VM stored in the shared storage;
    copy data from the memory file to a memory of the second VM;
    power off or shutting down the VM on the first host; and
    resume execution of the VM on the second host.

5. The method of claim 4, wherein the selected first partition response option further comprises using a storage interface on the first host to copy the memory of the VM to the memory file associated with the shared storage between the first host and the second host while the VM is in a powered-on state.

6. The method of claim 4, wherein the selected first network partition response option further comprises copying data from the memory file to the memory of the second VM using a second storage interface on the second host.

7. The method of claim 4, wherein the copying of the memory of the VM between the first host and the second host is done entirely via the memory file associated with the shared storage.

8. The method of claim 4, wherein the memory file comprises an entire memory state of the VM.

9. A system for responding to a network partition in a high availability (HA) cluster in a virtualized computing system, the HA cluster comprising a management server and a set of hosts over which a set of virtual machines run, the virtualized computing environment comprising a management network via which the management server is connected to the hosts, a migration network via which a VM is migrated from one of the hosts to another of the hosts, and a VM network, wherein the management network, the migration network and the VM network are three different networks, the system comprising:

a display;
    a user interface; and
    one or more processors programmed to:
        detect the network partition in the high availability (HA) cluster, wherein detecting comprises identifying that a first set of hosts fails to contact a second set of hosts over the management network, the first set of hosts being in a first network partition and the second set of hosts being in a second network partition;
        upon detecting the network partition, determine that a first host is in the first network partition and that the first host has lost connectivity to the VM network;
        provide, on the display, a plurality of network partition response options for the high availability (HA) cluster, the plurality of network partition response options comprising all of the following: live migration, live migration over storage, shutdown/restart, and leave power on, wherein the live migration over storage option is performed using a shared storage to transfer the execution state of the VM from a first host to a second host;
        receive, via the user interface, a selection of a first network partition response option from the plurality of network partition response options; and
        transfer execution of a VM on the first host in the first network partition in the high availability (HA) cluster to the second host in the second network partition in the high availability (HA) cluster that has VM network connectivity.

10. The system of claim 9, wherein the selected first network partition response option further causes the one or more processors to:
    encapsulate an entire state of the VM using a set of files stored on the shared storage between the first host and the second host;
    transfer a memory and execution state of the VM to the second host while the VM is in a powered-on state;
    virtualize networks used by the VM on the first host;
    power off or shutting down the VM on the first host; and
    resume execution of the VM on the second host.

11. The system of claim 9, wherein the selected first network partition response option further causes the one or more processors to:
  power off or shut down the VM on the first host; and
  restart the VM on the second host.

12. The system of claim 9, wherein the selected first network partition response option further causes the one or more processors to:
  copy a memory of the VM to a memory file associated with the shared storage between the first and the second host while the VM is in a powered-on state;
  instantiate a second VM on the second host, the second VM being based on data associated with the VM stored in the shared storage;
  copy data from the memory file to a memory of the second VM;
  power off or shutting down the VM on the first host; and
  resume execution of the VM on the second host.

13. The system of claim 12, wherein the selected first partition response option further causes the one or more processors to use a storage interface on the first host to copy the memory of the VM to the memory file associated with the shared storage between the first host and the second host while the VM is in a powered-on state.

14. The system of claim 12, wherein the selected first network partition response option further causes the one or more processors to copy data from the memory file to the memory of the second VM using a second storage interface on the second host.

15. The system of claim 12, wherein the copying of the memory of the VM is done entirely via the memory file associated with the shared storage.

16. The system of claim 12, wherein the memory file comprises an entire memory state of the VM.

17. One or more non-transitory computer-readable media having computer-executable instructions for responding to a network partition in a high availability (HA) cluster in a virtualized computing system, the HA cluster comprising a management server and a set of hosts over which a set of virtual machines run, the virtualized computing environment comprising a management network via which the management server is connected to the hosts, a migration network via which a VM is migrated from one of the hosts to another of the hosts, and a VM network, wherein the management network, the migration network and the VM network are three different networks, the computer-executable instructions causing one or more processors to:
  detect the network partition in the high availability (HA) cluster, wherein detecting comprises identifying that a first set of hosts fails to contact a second set of hosts over the management network, the first set of hosts being in a first network partition and the second set of hosts being in a second network partition;
  upon detecting the network partition, determine that a first host is in the first network partition and that the first host has lost connectivity to the VM network;
  provide a plurality of network partition response options for the high availability (HA) cluster, the plurality of network partition response options comprising all of the following: live migration, live migration over storage, shutdown/restart, and leave power on, wherein the live migration over storage option is performed using a shared storage to transfer the execution state of the VM from the first host to a second host;
  receive a selection of a first network partition response option from the plurality of network partition response options; and
  transfer execution of a VM on the first host in the first network partition in the high availability (HA) cluster to the second host in the second network partition in the high availability (HA) cluster that has VM network connectivity.

18. The one or more non-transitory computer-readable media of claim 17, wherein the execution of the network partition response further comprises:
  encapsulating an entire state of the VM using a set of files stored on the shared storage between the first host and the second host;
  transfer a memory and execution state of the VM to the second host while the VM is in a powered-on state;
  virtualize networks used by the VM on the first host;
  power off or shutting down the VM on the first host; and
  resume execution of the VM on the second host.

19. The one or more non-transitory computer-readable media of claim 17, wherein the selected first network partition response option further causes the one or more processors to:
  copy a memory of the VM to a memory file associated with the shared storage between the first and the second host while the VM is in a powered-on state;
  instantiate a second VM on the second host, the second VM being based on data associated with the VM stored in the shared storage;
  copy data from the memory file to a memory of the second VM;
  power off or shutting down the VM on the first host; and
  resume execution of the VM on the second host.

20. The one or more non-transitory computer-readable media of claim 19, wherein the copying of the memory of the VM between the first host and the second host is done entirely via the memory file associated with the shared storage.

* * * * *